R. E. ZAGER.
TRACTION VEHICLE.
APPLICATION FILED JAN. 12, 1912.
1,055,010.
Patented Mar. 4, 1913.
2 SHEETS—SHEET 2.
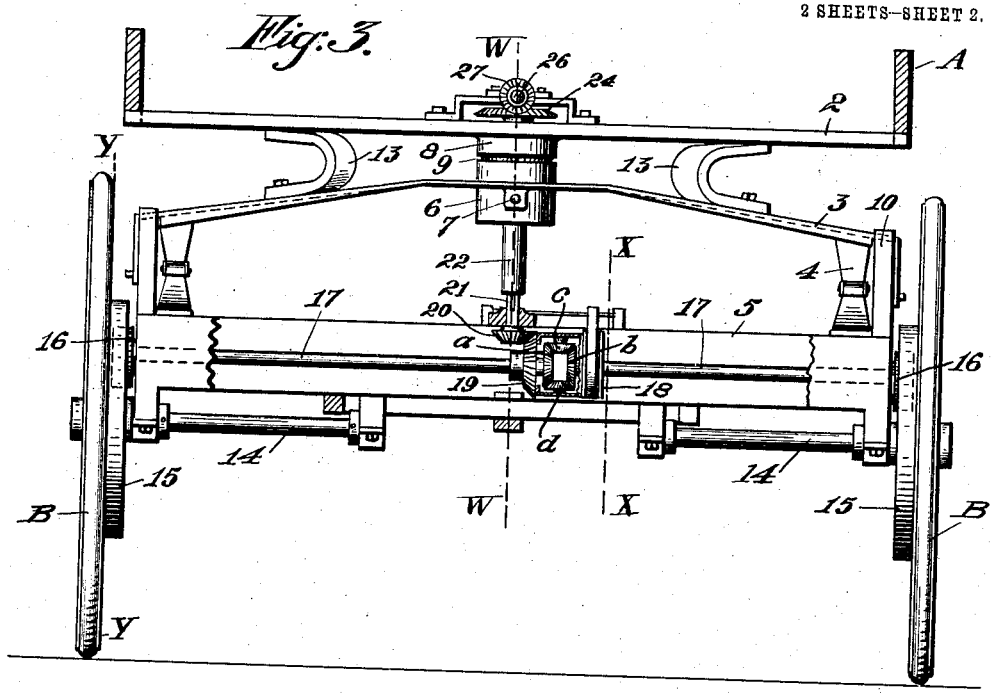
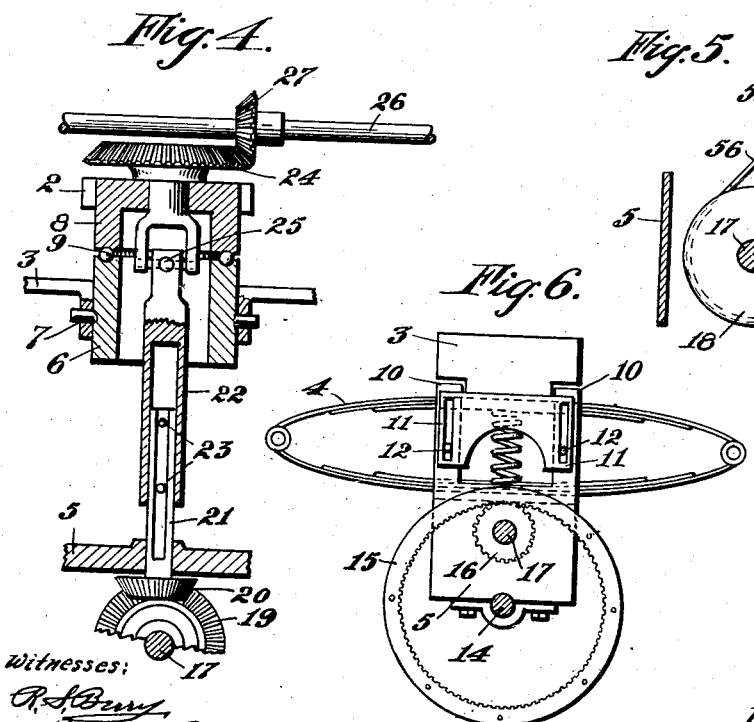
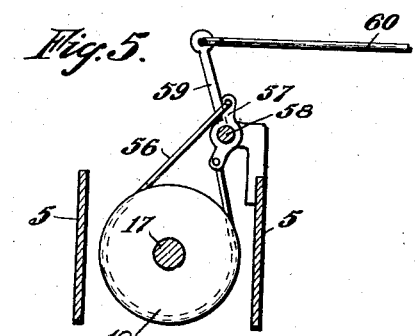
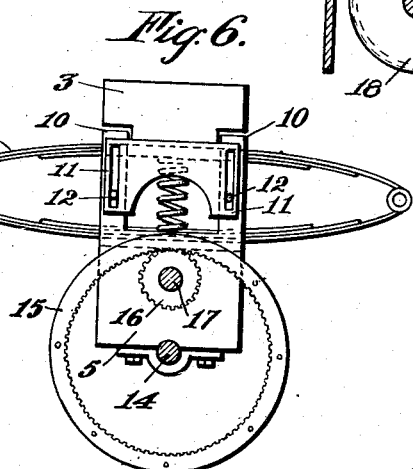
Witnesses:
Inventor
Robert E. Zager
By G. H. Strong,
Atty.

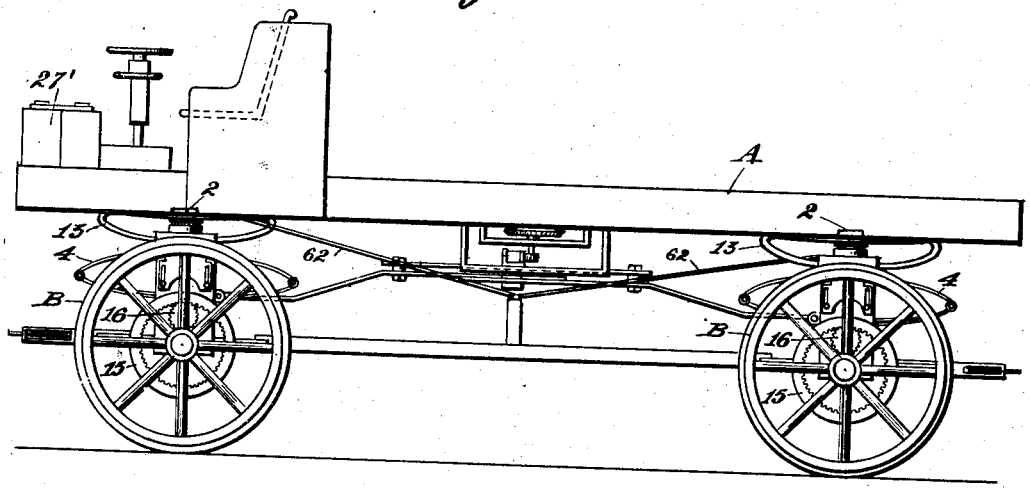
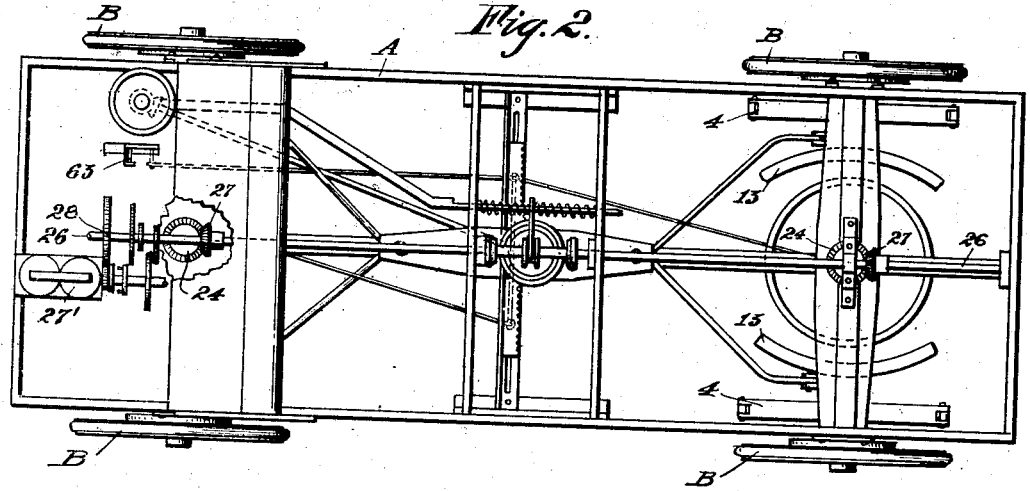

UNITED STATES PATENT OFFICE.

ROBERT E. ZAGER, OF HARDY, CALIFORNIA.

TRACTION-VEHICLE.

1,055,010. Specification of Letters Patent. Patented Mar. 4, 1913.

Application filed January 12, 1912. Serial No. 670,808.

*To all whom it may concern:*

Be it known that I, ROBERT E. ZAGER, a citizen of the United States, residing at Hardy, in the county of Mendocino and State of California, have invented new and useful Improvements in Traction-Vehicles, of which the following is a specification.

This invention relates to improvements in traction vehicles, and particularly pertains to the steering and driving gears thereof.

It is the object of this invention to provide a running gear for traction vehicles in which the front and rear trucks are swiveled and adapted to be swung in opposite directions in unison in steering the vehicle and in which the front and rear wheels may be power driven from one source of power irrespective of the positions of the trucks.

Other objects will appear in the following specification.

The invention consists of the parts and the construction and combination of parts as hereinafter more fully described and claimed, having reference to the accompanying drawings, in which—

Figure 1 is a side elevation of the invention. Fig. 2 is a plan view of same with parts broken away. Fig. 3 is a view in elevation of one of the trucks with parts broken away. Fig. 4 is an enlarged detail section on the line W—W Fig. 3. Fig. 5 is an enlarged detail section on the line X—X Fig. 3. Fig. 6 is an end view of the truck bolster taken on the line Y—Y Fig. 3.

In the drawings, A represents the chassis or frame of a traction vehicle, which frame may be of any suitable construction and is supported upon bolsters 2 adjacent to its front and rear ends.

The bolsters 2 are swivelly connected to vertically movable truck bolsters 3 which are supported upon suitable springs 4 mounted on the truck frame 5; the swiveled connection between the bolsters 2 and a truck bolster 3 comprising a ring 6 pivoted at 7 on the truck bolster 3 to rock sidewise in transverse relation to the chassis A and a ring 8 rigidly mounted on the underside of the bolster 2 which is supported on ball-bearings 9 carried in a circular raceway formed in the upper end of the pivoted ring 6, as shown in Fig. 4.

The outer ends of the truck bolsters 3 extend between parallel vertical posts 10 carried on the truck frame 5 and are formed with flanges 11 which project over the outer faces of the posts 10; pins 12 on the posts 10 extending through vertical slots formed in the flanges 11, as shown in Fig. 6. This construction forms a guide for the truck bolster 3 and retains it in place on the truck frame 5, and at the same time admitting of vertical movement of the bolster 3 in relation to the frame 5. The vertical movement of the bolster 3 is cushioned by the springs 4 in the usual manner. Side bearing plates 13 secured to the bolster 3 are disposed between the bolsters 2 and 3 to limit the side rocking movement of the bolster 2 in relation to the bolster 3.

The truck frames 5 are supported at each end upon wheels B, which are here shown as mounted on revoluble shafts 14 journaled on the truck frames 5, as shown in Fig. 3, each wheel being revoluble independent of the other wheels. Each of the wheels B is provided with an internal gear 15, and meshing with each gear 15 is a pinion 16 on a shaft 17 mounted in suitable bearings on the truck frames 5. The shafts 17 are designed to be driven from any suitable source of power through differential gears, indicated at $a$, $b$, $c$ and $d$ in Fig. 3. The gears $a$ and $b$ are rigidly mounted on the ends of the shafts 17 and the gears $c$ and $d$ are revolubly mounted on a casing 18, which in turn is revolubly mounted on the shafts 17 in the usual manner.

A beveled gear 19 is formed on one end of each casing 18 and meshes with a pinion 20 mounted on the lower end of a vertical stem 21 which extends into a tubular shaft 22. The stem 21 is slotted longitudinally, and pins 23 extend through the shaft 22 and the slot in the stem 21 to lock the shaft and stem together in such a manner that when the shaft 22 is revolved the stem 21 will rotate therewith and at the same time admit of a reciprocal movement of the stem in relation to the shaft. The shaft 22 is connected to a beveled gear 24 through a universal joint 25 and passes through the rings 6 and 8, as shown in Fig. 4, the shaft 22 and pin 21 forming a king-pin around which the truck frames 5 revolve.

A countershaft 26 extends lengthwise of the chassis A centrally thereof and has pinions 27 rigidly mounted thereon which mesh with the gears 24 on the king-pins in such manner that when the countershaft is rotated, the several shafts 17 on the front and rear truck frames 5 will be rotated in unison through the differential gears and thereby rotate the wheels B through the pinions 16 and internal gears 15 to propel the vehicle. The countershaft 26 may be driven from any suitable source of power; an engine 27' operating through transmission gears 28 being here shown for that purpose.

As a means for retarding the movements of the vehicle, band brakes 56 are provided; the brakes 56 being arranged to act on the casing 18 of the differential gears, as shown in Fig. 5. Any suitable means may be employed for operating the brakes as desired; the mechanism here shown comprising arms 57 on shafts 58, to the ends of which the bands 56 are attached, rocker arms 59 on the shafts 58 connected to rods 60 leading to a rocking lever 61 disposed centrally of the chassis A, and a rod 62 connecting the lever 61 to a foot lever 63 by the operation of which the brake bands may be thrown in or out of engagement with the brake drum formed on the differential casing.

Having thus described my invention, what I claim and desire to secure by Letters Patent is—

1. In a traction vehicle, a main frame, a truck frame, a ring pivotally mounted on said truck, a ring on said main frame bearing on the ring on the truck, a tubular shaft mounted in said main frame extending through said rings, a universal joint in said shaft, a shaft extending into said tubular shaft and splined thereto, differential gears carried on the truck frame, means for driving said gears from said shafts, traction wheels on said truck frame, and means for rotating said wheels from said differential gears.

2. In a traction vehicle, a main frame, a truck frame, a ring pivotally mounted on said truck, a ring on said main frame bearing on the ring on the truck, a tubular shaft mounted in said main frame extending through said rings, a universal joint in said shaft, a shaft extending into said tubular shaft and splined thereto, differential gears carried on the truck frame, means for driving said gears from said shafts, traction wheels on said truck frame, means for rotating said wheels from said differential gears including shafts connected with the differential gears, pinions on said shafts, and internal gears on said wheels with which said pinions mesh.

In testimony whereof I have hereunto set my hand in the presence of two subscribing witnesses.

ROBERT E. ZAGER.

Witnesses:
JOHN H. HERRING,
CHARLES EDELMAN.

Copies of this patent may be obtained for five cents each, by addressing the "Commissioner of Patents. Washington, D. C."